(12) United States Patent
Budinski

(10) Patent No.: US 8,003,279 B2
(45) Date of Patent: Aug. 23, 2011

(54) ELECTRICALLY CONDUCTIVE ELEMENT TREATED FOR USE IN A FUEL CELL

(75) Inventor: Michael K. Budinski, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 571 days.

(21) Appl. No.: 12/143,302

(22) Filed: Jun. 20, 2008

(65) Prior Publication Data

US 2008/0251770 A1    Oct. 16, 2008

Related U.S. Application Data

(62) Division of application No. 10/638,851, filed on Aug. 11, 2003, now Pat. No. 7,396,559.

(51) Int. Cl.
*H01M 4/64* (2006.01)

(52) U.S. Cl. ........ 429/518; 429/520; 429/521; 429/522; 427/115

(58) Field of Classification Search ............ 429/517, 429/520, 519, 522, 518, 521; 252/512, 518.1; 427/115

See application file for complete search history.

(56) References Cited

U.S. PATENT DOCUMENTS

| | | |
|---|---|---|
| 4,009,115 A | 2/1977 | Binns |
| 4,124,407 A | 11/1978 | Binns |
| 4,581,102 A | 4/1986 | Brock |
| 5,578,388 A | 11/1996 | Faita et al. |
| 5,728,283 A | 3/1998 | Reuter et al. |
| 5,798,188 A | 8/1998 | Mukohyama et al. |
| 5,952,118 A | 9/1999 | Ledjeff et al. |
| 6,174,383 B1 | 1/2001 | Angel et al. |
| 6,210,491 B1 | 4/2001 | Colgan et al. |
| 6,291,094 B1* | 9/2001 | Yoshimura et al. ........... 429/492 |
| 6,372,376 B1 | 4/2002 | Fronk et al. |
| 6,428,625 B1 | 8/2002 | Colgan et al. |
| 6,645,306 B2 | 11/2003 | Madi et al. |
| 7,396,559 B2 | 7/2008 | Budinski |
| 2003/0118888 A1 | 6/2003 | Allen |
| 2003/0157391 A1 | 8/2003 | Coleman et al. |
| 2004/0011378 A1 | 1/2004 | Jackson |
| 2004/0253505 A1* | 12/2004 | Blunk et al. .................. 429/44 |
| 2005/0267004 A1 | 12/2005 | Abd Elhamid et al. |

FOREIGN PATENT DOCUMENTS

WO    WO 96/37005    11/1996

OTHER PUBLICATIONS

German Office Action issued in related German Patent Application No. DE 10 2004 038 632.3-45. German language document.

* cited by examiner

*Primary Examiner* — Raymond Alejandro

(74) *Attorney, Agent, or Firm* — Harness, Dickey & Pierce, P.L.C.

(57) ABSTRACT

An electrically conductive element for a proton exchange membrane fuel cell having low electrical contact resistance and high corrosion resistance. The conductive element comprises a corrosion susceptible metal substrate with a surface, which is preferably treated to activate the surface (i.e., to remove a passivation layer of oxides from the surface) with an acidic treatment solution. The treated surface is then overlaid with an electrically conductive, corrosion-resistant, protective coating to protect the substrate re-forming a passivation layer while exposed to the corrosive environment of the fuel cell.

10 Claims, 7 Drawing Sheets

ELECTRICALLY CONDUCTIVE ELEMENT TREATED FOR USE IN A FUEL CELL

CROSS REFERENCE TO RELATED APPLICATIONS

This application is a divisional of U.S. patent application Ser. No. 10/638,851 filed on Aug. 11, 2003, which issued as U.S. Pat. No. 7,396,559 on Jul. 8, 2008. The disclosure of the above application is incorporated herein by reference.

FIELD OF THE INVENTION

The present invention relates to PEM fuel cells and more particularly to corrosion-resistant electrically conductive elements therefore.

BACKGROUND OF THE INVENTION

Fuel cells have been proposed as a power source for electric vehicles and other applications. One known fuel cell is the PEM (i.e., Proton Exchange Membrane) fuel cell that includes a so-called MEA ("membrane-electrode-assembly") comprising a thin, solid polymer membrane-electrolyte having an anode on one face and a cathode on the opposite face. The anode and cathode typically comprise finely divided carbon particles, very finely divided catalytic particles supported on the internal and external surfaces of the carbon particles, and proton conductive material intermingled with the catalytic and carbon particles. The MEA is sandwiched between a pair of electrically conductive contact elements which serve as current collectors for the anode and cathode, which may contain appropriate channels and openings therein for distributing the fuel cell's gaseous reactants (i.e., $H_2$ and $O_2$/air) over the surfaces of the respective anode and cathode.

Bipolar PEM fuel cells comprise a plurality of the MEAs stacked together in electrical series while being separated one from the next by an impermeable, electrically conductive contact element known as a bipolar plate or current collector. The current collector or bipolar plate has two working surfaces, one confronting the anode of one cell and the other confronting the cathode on the next adjacent cell in the stack, and electrically conducts current between the adjacent cells. Contact elements at the ends of the stack contact only the end cells and are referred to as end plates.

Contact elements are often constructed from electrically conductive metallic materials. In an $H_2$ and $O_2$/air PEM fuel cell environment, the bipolar plates and other contact elements (e.g., end plates) are in constant contact with moderately acidic solutions (pH 3-5) and operate in a highly oxidizing environment, being polarized to a maximum of about +1 V (vs. the normal hydrogen electrode). On the cathode side the contact elements are exposed to pressurized air, and on the anode side exposed to atmospheric hydrogen. Unfortunately, many metals are susceptible to corrosion in the hostile PEM fuel cell environment, and contact elements made therefrom either dissolve (e.g., in the case of aluminum), or form highly electrically resistive, passivating oxide films on their surface (e.g., in the case of titanium or stainless steel) that increases the internal resistance of the fuel cell and reduces its performance. Thus, there is a need to provide electrically conductive elements that maintain electrical conductivity, resist the fuel cell aggressive environment, and improve overall operational efficiency of a fuel cell.

SUMMARY OF THE INVENTION

The present invention relates to an electrically conductive element which in one preferred embodiment comprises an electrically conductive corrosion susceptible metal substrate having a contact resistance of less than or equal to about 10 $m\Omega\text{-}cm^2$ under a compressive force of about 2700 kPa, and an electrically conductive corrosion resistant coating overlying one or more regions of a surface of the metal substrate.

Other preferred embodiments according to the present invention include methods of making an electrically conductive element. One method comprises providing a conductive metal substrate having a surface susceptible to passivation in the presence of oxygen by forming oxides. An acidic treatment solution is applied to the surface to remove the oxides and reduce contact resistance of the surface as compared to its pre-treated state. The surface is rinsed to remove substantially all of the treatment solution, and then coated with a corrosion resistant electrically conductive coating.

Alternate preferred embodiments of the present invention contemplate a composition for treating a surface of a metallic substrate having a metal oxide at the surface. The composition comprises a solution comprising a solvent and a solute, where the solution has a pH equal to or less than about 4, and where the solute comprises an anionic species of one or more halogen ions present in the solution at a concentration of from about $1\times10^{-1}$ to about $1\times10^{-6}$ molar.

Other alternate embodiments of the present invention include methods of treating a surface of a metallic substrate having metal oxide at the surface, the method comprising contacting the surface with an acidic solution to react with the metal oxide without an impressed electrical current to form a metal halide species soluble in the solution where the solution has a pH of from 0 to about 4. The metal halide is separated from the surface. The surface is rinsed with a rinse solution, which thus, removes the solution and the metal halide from the surface.

Further the present invention contemplates in other preferred alternate embodiments a method of treating a surface of a metallic substrate having a metal oxide at the surface by contacting the surface with an acidic solution to react with the metal oxide without an impressed electrical current to form a metal halide species soluble in the solution wherein the solution has an anionic species of one or more halogen ions present in the solution at a concentration of from about $1\times10^{-1}$ to about $1\times10^{-6}$ molar. The metal halide is separated from the surface and the surface is rinsed with a rinse solution, thus removing the solution and the metal halide from the surface.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention relates to a PEM fuel cell having at least one cell comprising a pair of opposite polarity electrodes, a membrane electrolyte interjacent the electrodes for conducting ions therebetween, and an electrically conductive element confronting at least one of the electrodes. The conductive element has a working surface that serves to conduct electrical current from that electrode. The conductive element comprises a metal substrate with a surface, which is preferably treated according to the present invention, to activate the surface, that is, to remove a passivation or oxide layer from the surface. The treated surface is then overlaid with an electrically conductive, corrosion-resistant, protective coating to protect the substrate from the corrosive environment of the fuel cell. By "corrosion susceptible metal" is meant that the metal is either oxidized/passivated or dissolved by the cell's environment.

Figure 1:
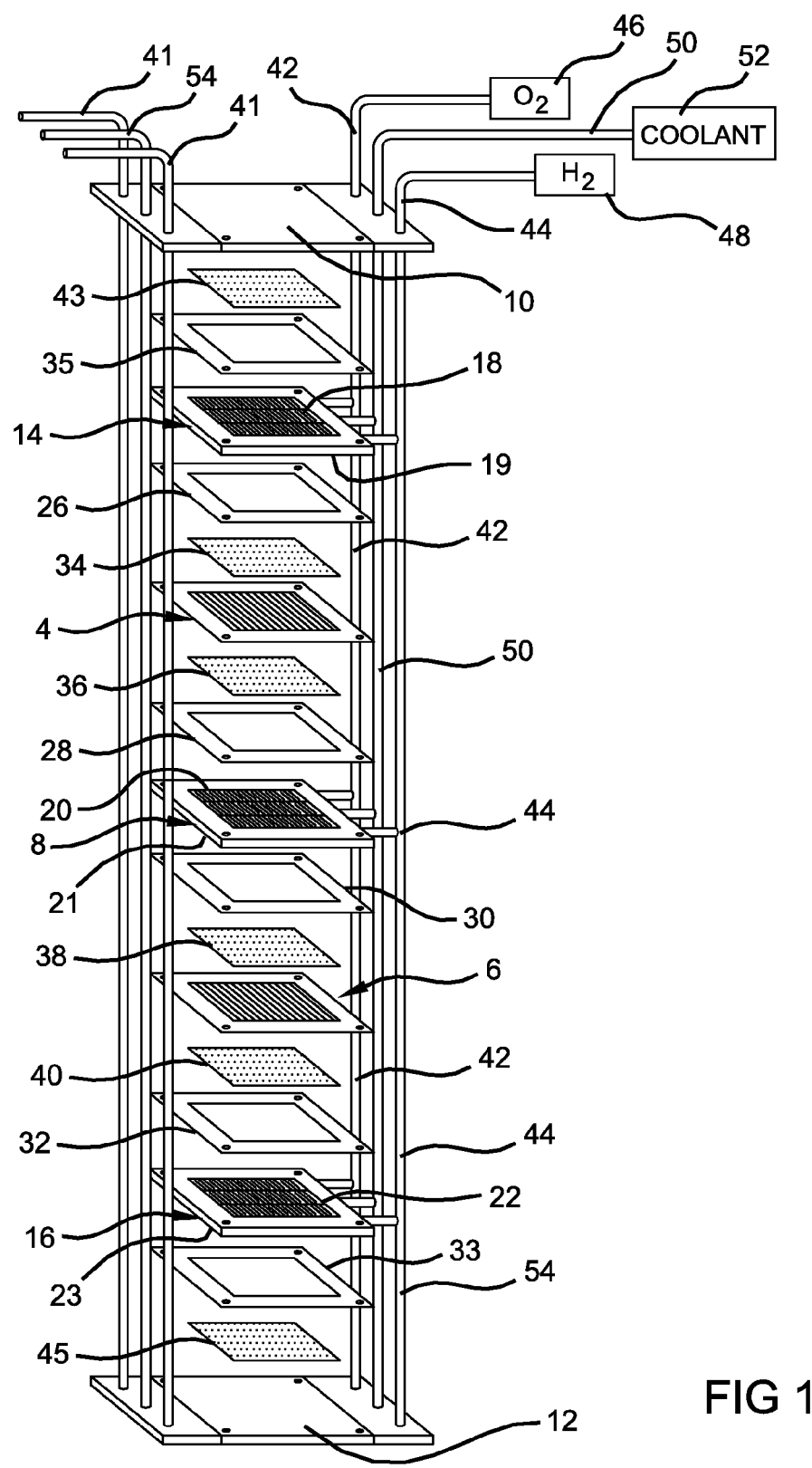
FIG. 1 is a schematic, exploded, isometric, illustration of a liquid-cooled PEM fuel cell stack (only two cells shown)

To gain a better understanding of the present invention, an exemplary fuel cell where the present invention may be employed is shown in FIG. 1, which depicts two individual proton exchange membrane (PEM) fuel cells connected to form a stack having a pair of membrane-electrode-assemblies (MEAs) 4, 6 separated from each other by an electrically conductive, liquid-cooled, bipolar separator plate conductive element 8. An individual fuel cell, which is not connected in series within a stack, has a separator plate 8 with a single electrically active side. In a stack, a preferred bipolar separator plate 8 typically has two electrically active sides 20, 21 within the stack, each active side 20, 21 respectively facing a separate MEA 4, 6 with opposite charges that are separated, hence the so-called "bipolar" plate. As described herein, the fuel cell stack is described as having conductive bipolar plates, however the present invention is equally applicable to stacks having only a single fuel cell.

The MEAs 4,6 and bipolar plate 8 are stacked together between stainless steel clamping terminal plates 10,12 and end contact fluid distribution elements 14,16. The end fluid distribution elements 14, 16, as well as both working faces or sides 20,21 of the bipolar plate 8, contain a plurality of lands adjacent to grooves or channels on the active faces 18, 19, 20, 21, 22, and 23 for distributing fuel and oxidant gases (i.e., $H_2$ and $O_2$) to the MEAs 4,6. Nonconductive gaskets or seals 26, 28, 30, 32, 33, and 35 provide seals and electrical insulation between the several components of the fuel cell stack. Gas-permeable conductive diffusion media 34, 36, 38, and 40 press up against the electrode faces of the MEAs 4,6. Additional layers of conductive media 43, 45 are placed between the end contact fluid distribution elements 14,16 and the terminal collector plates 10,12 to provide a conductive pathway therebetween when the stack is compressed during normal operating conditions. The end contact fluid distribution elements 14,16 press up against the diffusion media 34,43 and 40,45 respectively.

Oxygen is supplied to the cathode side of the fuel cell stack from storage tank 46 via appropriate supply plumbing 42, while hydrogen is supplied to the anode side of the fuel cell from storage tank 48, via appropriate supply plumbing 44. Alternatively, air may be supplied to the cathode side from the ambient, and hydrogen to the anode from a methanol or gasoline reformer, or the like. Exhaust plumbing 41 for both the $H_2$ and $O_2$/air sides of the MEAs is also provided. Additional plumbing 50 is provided for circulating coolant from a storage area 52 through the bipolar plate 8 and end plates 14, 16 and out the exit plumbing 54.

Figure 2:
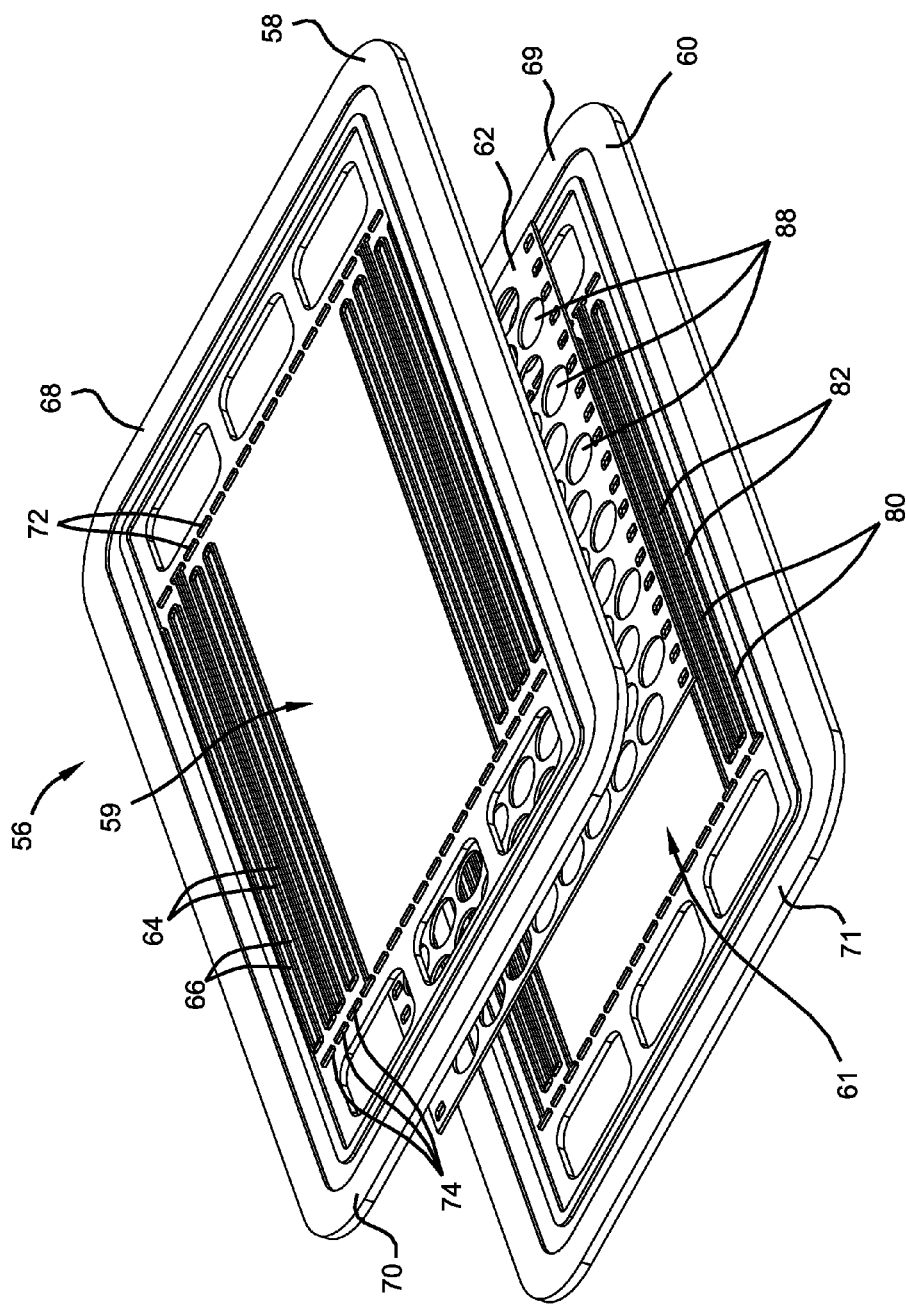
FIG. 2 is an exploded, isometric view of a bipolar plate useful with PEM fuel cell stacks like that illustrated in FIG. 1.

FIG. 2 is an isometric, exploded view of a bipolar plate 56 comprising a first exterior metal sheet 58, a second exterior metal sheet 60, and an interior spacer metal sheet 62 interjacent the first metal sheet 58 and the second metal sheet 60. The exterior metal sheets 58,60 are made as thin as possible (e.g., about 0.002-0.02 inches thick), which may be formed by stamping, by photo etching (i.e., through a photolithographic mask), electroforming, or any other conventional process for shaping sheet metal. The external sheet 58 has a first working surface 59 on the outside thereof which confronts a membrane-electrode-assembly (not shown) and is formed so as to provide a plurality of lands 64 which define therebetween a plurality of grooves 66 known as a "flow field" through which the fuel cell's reactant gases (i.e., $H_2$ or $O_2$) flow in a tortuous path from one side 68 of the bipolar plate to the other side 70 thereof. When the fuel cell is fully assembled, the lands 64 press against the carbon/graphite papers (such as 36 or 38 in FIG. 1) which, in turn, press against the MEAs (such as 4 or 6 in FIG. 1, respectively). For drafting simplicity, FIG. 2 depicts only two arrays of lands 64 and grooves 66. In reality, the lands and grooves 64,66 will cover the entire external surfaces of the metal sheets 58, 60 that engage the carbon/graphite papers. The reactant gas is supplied to grooves 66 from a header or manifold groove 72 that lies along one side 68 of the fuel cell, and exits the grooves 66 via another header/manifold groove 74 that lies adjacent the opposite side 70 of the fuel cell.

Figure 3:
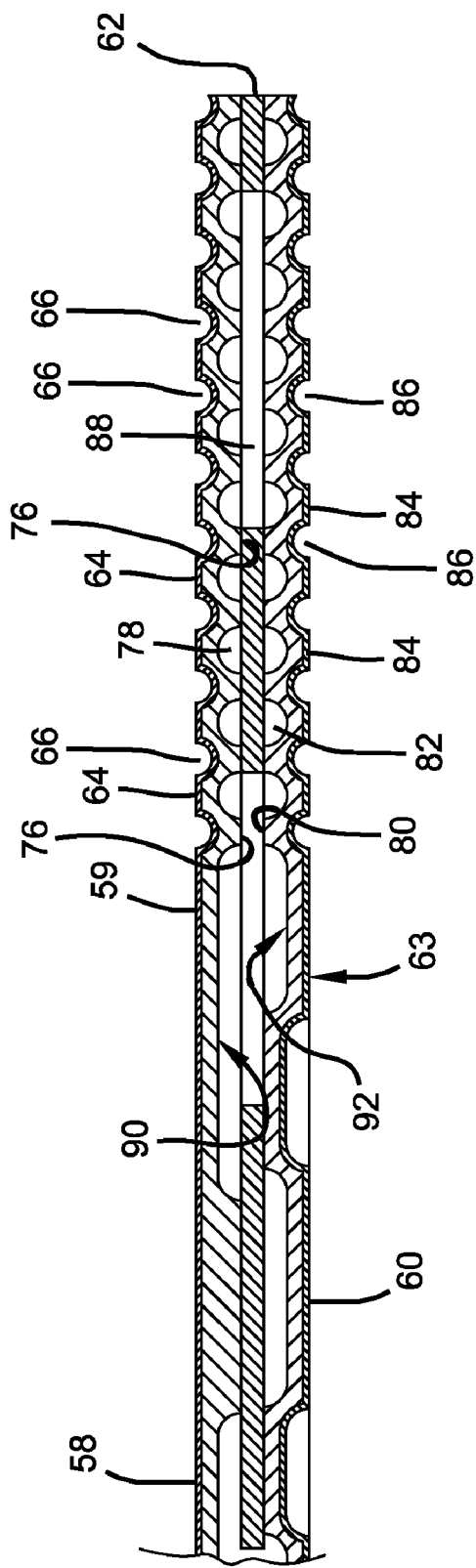
FIG. 3 is a partial cross-sectional view in the direction 3-3 of FIG. 2.

As best shown in FIG. 3, the underside of the sheet 58 includes a plurality of ridges 76 which define therebetween a plurality of channels 78 through which coolant passes during the operation of the fuel cell. As shown in FIG. 3, a coolant channel 78 underlies each land 64 while a reactant gas groove 66 underlies each ridge 76. Alternatively, the sheet 58 could be flat and the flow field formed in a separate sheet of material. Metal sheet 60 is similar to sheet 58. The internal surface 61 (i.e., coolant side) of sheet 60 is shown in FIG. 2.

In this regard, there is depicted a plurality of ridges 80 defining therebetween a plurality of channels 82 through which coolant flows from one side 69 of the bipolar plate to the other 71. Like sheet 58 and as best shown in FIG. 3, the external side of the sheet 60 has a working surface 63 having a plurality of lands 84 thereon defining a plurality of grooves 86 through which the reactant gases pass. An interior metal spacer sheet 62 is positioned interjacent the exterior sheets 58,60 and includes a plurality of apertures 88 therein to permit coolant to flow between the channels 82 in sheet 60 and the channels 78 in the sheet 58 thereby breaking laminar boundary layers and affording turbulence which enhances heat exchange with inside surfaces 90, 92 of the exterior sheets 58, 60 respectively.

The spacer sheet 62 is positioned between the first sheet 58 and second sheet 60, where the ridges 76 on the first sheet 58 and the ridges 80 on the second sheet 60 are bonded (e.g. by a bonding layer 85, such as brazement or adhesives) to the spacer sheet 62. As recognized by one of skill in the art, the current collectors of the present invention may vary in design from those described above, such as for example, in the configuration of flow fields, placement and number of fluid delivery manifolds, and the coolant circulation system, however, the function of conductance of electrical current through the surface and body of the current collector functions similarly between all designs.

Figure 4:
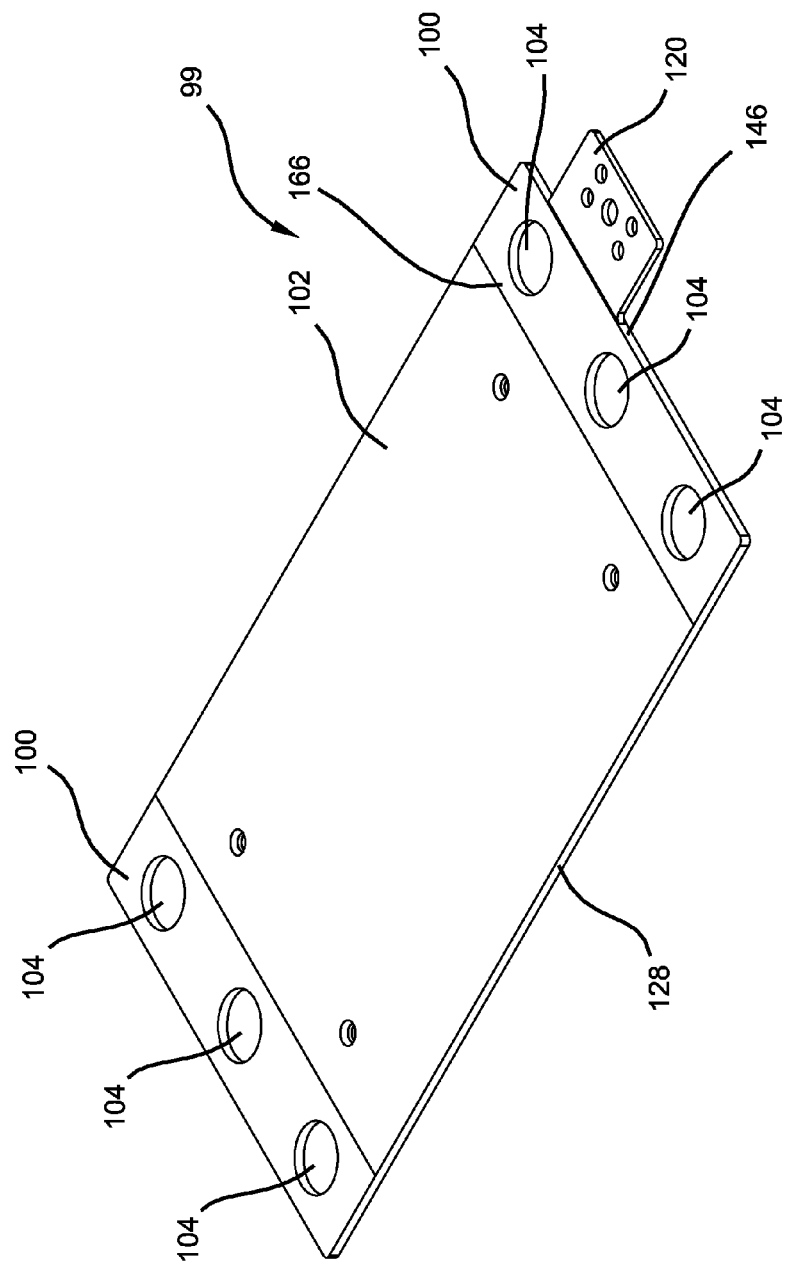
FIG. 4 is a terminal collector end plate.

The present invention is also applicable to other conductive elements in a fuel cell, such as terminal collector end plates like the exemplary one shown in FIG. 4. A terminal collector end plate 99 (such as 10 or 12 of FIG. 1) has an electrically non-conductive region 100, as well as an electrically conductive region 102. The conductive regions 102 of the terminal plate 99 are typically separated from the non-conductive region 100 by sealing gaskets 33,35 (FIG. 1). Apertures 104 within the non-conductive region 100 extend through the body, or substrate, 128 of the terminal plate 99 and permit fluid transport (e.g. $H_2$, $O_2$, coolant, anode and cathode effluent) both into and out of the stack during operating conditions. The particular quantity or sequence of the apertures 104 is not limiting, and is merely exemplary as described herein, as numerous configurations are possible as recognized by one of skill in the art. A bipolar plate flow field design may dictate the inlet and outlet aperture 104 configurations and fluid delivery placement. An electrically conductive collector tab 120 can be attached to external leads, facilitating the external collection of current from the stack.

Selection of the material of construction for an electrically conductive element within a fuel cell, such as bipolar plates or terminal plates, includes weighing such parameters as overall density (mass and volume), electrical contact resistance of the substrate measured at the surface, bulk conductivity, and corrosion and oxidation resistance. Thus, the important considerations for an electrical element include surface and bulk intrinsic conductivity of the material to perform as an electrical current collector, while withstanding the potentially corrosive conditions experienced within the fuel cell. It is preferred that current collectors according to the present invention comprise a conductive metal.

Metal materials undergo a variety of chemical reactions that impact functionality within the fuel cell. Passivation, as used herein, generally refers to a conversion process of treating a metal to render the surface less chemically reactive and falls within the process of corrosion, where the metal is attacked by a corrosive agent. After passivation has occurred in certain metals, the surface is coated with a protective passivation film that renders the surface of the plate more electrochemically inert than its pre-treated state. Such a passivation layer may protect the underlying metal by making it less prone to corrosion when compared with the pre-treated metal surface, such as is the case with stainless steel alloys.

Although metal surfaces are often intentionally processed to form the passivation layer, mere exposure to oxygen (or air) also passivates certain metallic surfaces. While having corrosion resistance benefits, passivated surfaces in conductive metals also exhibit high electrical contact resistance values, generally making such metals having passivated surfaces poor electrical conductors. Although not limiting to the manner in which the present invention operates, it is believed that one of the primary reasons for poor electrical surface conductivity after passivation of a metal surface is due to the formation of metal oxides in a passivation layer. Activation, in contrast to passivation, is the conversion process of making a surface relatively more active. Thus, activation often entails removing or thinning the passivation layer from a surface, by subjecting the surface to reducing conditions, which renders it more electrochemically active and hence reduces electrical contact resistance.

Stainless steel is generally defined as an iron-chromium alloy with a minimum of 9% chromium. Other ferritic, martensitic, or austenitic alloys are contemplated for use in PEM fuel cells. Stainless steels rich in chromium (i.e., at least 16% by weight), nickel (i.e., at least 20% by weight), and molybdenum (i.e., at least 3% by weight) are particularly desirable metals for use within a fuel cell, due to their relatively high bulk electrical conductivity and corrosion resistance provided by a dense passivation (i.e., metal oxide) layer at the surface. Thin stainless steel plates can be used to decrease the volumetric and weight power density of the fuel cell stack. Further, stainless steel materials have relatively high strength, physical durability, adherence to protective coatings, and are less expensive than many other conductive metal alternatives. However, the oxide layer at the surface impermissibly increases electrical contact resistance of the substrate, which has previously prevented its independent use as an electrical contact element or current collector. Further many other relatively lightweight metals are susceptible to corrosive attack (e.g. aluminum and titanium), and in light of such corrosion sensitivity and similar propensity for oxidation, various protective coatings are used for the metal substrate. Often such protective coatings increase the electrical resistance of the metal plate to unacceptable levels or are very costly, such as with gold or platinum coatings. Thus, there is a trade-off between conductivity and corrosion protection. It is an object of the present invention to reduce the overall electrical contact resistance of an electrically conductive element, while providing corrosion and oxidation resistance for the underlying metal substrate of the conductive element.

Previous methods to overcome such high electrical contact resistance include treating a conductive metal substrate to clean the surface of a passivation layer (e.g. metal oxides), and then coating with a prophylactic coating. Current cleaning methods often employ cathodic cleaning where electrical current (e.g. a current density of 4 $A/cm^2$) is impressed onto the conductive substrate which is in contact with an electrolyte to facilitate the generation of gas bubbles at the surface, such as cathodic cleaning described in ASTM B254 7.4.1, for example. Such cathodic cleaning generally takes a minimum processing time of 10 minutes (typically much longer) to effectively clean the metal substrate, and is not generally suitable for high production coil coating processes. Reducing processing time is an important consideration when using continuous manufacturing methods for creating electrically conductive elements or other components within an electrochemical cell.

Other cleaning methods include mechanical abrasion of the surface, or cleaning the substrate with commercially available alkaline cleaners, acidic solvents, or pickle liquors. Other methods of treating a conductive metal substrate include pre-sputtering the surface of the metal in a physical vapor deposition (PVD) chamber, and radio-frequency glow-discharge treatment. The above described methods of removing the passivation layer from the metal are not thought to sufficiently reduce contact resistance to an acceptable value and simultaneously reduce processing time, to allow for the use of metals susceptible to passivation as current collector elements.

According to one aspect of the present invention, an electrically conductive element or current collector made of a corrosion-susceptible metal is treated to impart a low contact resistance and the ability to withstand corrosion and oxidative attack, while minimizing the amount of substrate metal lost during the activation process. Such a treatment permits the use of metals, such as stainless steel, which previously had too high of an electrical contact resistance for practical use in a fuel cell.

Corrosion-susceptible metal substrates treated according to the present invention have significantly reduced contact resistance values as compared with their pre-treated state. In one preferred embodiment of the present invention, a surface of the electrically conductive element is activated by treatment with an acidic solution having a composition such that metal oxides in a passivation layer at the surface are soluble therein, and thus are removed from the surface of the metal substrate. The acid solution is designed to react with and convert metal oxides to soluble constituents that may be readily removed from the surface. In selecting the preferred composition of the acid solution, the thermodynamics for various constituents in the metal substrate are evaluated over a range of pH values. Thus, for a preferred embodiment, the metal substrate is stainless steel, such as for example 316L (UNS S31603), an alloy which contains iron, chromium, nickel, and molybdenum. By evaluating the thermodynamics of each constituent metal oxide, it becomes possible to select a desirable pH range where the metal oxide phases might form unstable species. While evaluating such thermodynamic data, certain preferable anions have been discovered which alter the constituent metal oxide phases at preferred conditions, thus creating soluble metal species that react with the anions, thus dissolving the metal oxide phases by ionic interaction at the metal surface.

In preferred embodiments of the present invention, the pH of the acidic solution is less than 7, preferably between 0 and about 4, and most preferably between about 2 to about 4. The acidic solution comprises a solvent and a solute. The solute preferably comprises at least one acidic anion and a corresponding conjugate cation. As recognized by one of skill in the art, the selection of anion(s)/cation(s) for the acidic solution effects the pH (due to the PKa value of the anion and cation). Thus, anions that provide the requisite pH, while also enabling formation of soluble metal species from the metal oxides are preferred for use with the present invention.

Preferred anions according to the present invention are halogen ions, including fluoride ($F^-$), chloride ($Cl^-$), bromide ($Br^-$), iodide ($I^-$), as well as sulfate ($SO_4^{2-}$), nitrate ($NO_3^-$), and mixtures thereof. The most preferred anions according to the present invention are fluoride ($F^-$) and sulfate ($SO_4^{2-}$). The preferred cations comprise hydrogen protons. Preferred solvents in the acidic solution according to the present invention comprise water. Thus, preferred solutes (with both anions and cations) according to the present invention include halides, such as hydrofluoric acid, hydrochloric acid, hydrobromic acid, hydriodic acid, as well as, sulfuric acid, nitric acid, and mixtures thereof.

As an example, when the electrically conductive element is selected to be 316L stainless steel (a corrosion-susceptible metal substrate), the nickel and ferric oxides have limited domains of stability across the range of all pH values, and will react to form other species at low pH values and high potentials. However, the chromium oxide species are stable and exist even at very low pHs. It has been found that when a fluoride anion is incorporated at concentrations of greater than $1 \times 10^{-6}$ into an acidic treatment solution (preferably in a solution also comprising sulfuric acid that has a pH equal to or below 4) the chromic oxides will form chromium fluoride. Chromium fluoride is soluble in the acidic treatment solution. The metal oxides are thus transformed by reaction with the anions to metal compounds that are soluble in the solvent at the appropriate pH conditions, such as metal halides when the anion is a halogen.

In one preferred embodiment of the present invention, where the halogen ion in the solute is fluoride, the preferred concentration of fluoride anions in the acidic solution of the present invention is from about $1 \times 10^{-1}$ to about $1 \times 10^{-6}$ molarity. This concentration is selected to optimize the pH of the solution and the amount of anions needed to achieve the necessary reaction with metal oxides at the surface. From empirical observation, the greater the concentration of preferred anions (i.e., closer to $1 \times 10^{-1}$), the higher the pH value may be while still achieving the necessary reduction in metal oxides at the surface. Likewise, it has been observed that the less the concentration of preferred anions (i.e., closer to $1 \times 10^{-6}$) in the acid treatment solution, the lower the pH value must be. It should be noted that other solutes may be present to achieve the necessary low pH value, but may not contain anions according to the present invention that react with metal oxides to create the desirable soluble metal constituent at the surface of the metal substrate. In certain preferred embodiments of the present invention, the concentration of the halide is from between about $1 \times 10^{-3}$ and about $1 \times 10^{-5}$ molarity in the acidic treatment solution, which has a pH of between about 2 and about 4.

Preferred temperature conditions for applying the acid treatment solution to the metal surface range from about 25° C. (room temperature) to about 100° C. at ambient atmospheric pressure. The acid treatment solutions of the present invention are not only highly effective in surface activation, but also significantly reduce the treatment time to achieve the activation. Shorter processing times prevent excessive and unnecessary removal of the underlying substrate metal, and further makes the present invention well suited for continuous manufacturing processes. The preferred duration for exposing the metal surface to the acid solution ranges from approximately 3 seconds up to about 600 seconds (10 minutes). The most preferred duration of treatment is between about 3 to about 120 seconds (2 minutes). As appreciated by one of skill in the art, the processing time is dependent on a variety of factors, including the aggressiveness of the acidic treatment solution, the character and extent of the passivation layer on the metal, and the relative amount of surface area to be activated. The present invention is readily adaptable to continuous manufacturing processes, which provides increased productivity by requiring less processing time, while enhancing the overall quality of surface activation.

Methods of treating the metal substrate according to preferred embodiments of the present invention comprise providing a conductive metal substrate with a surface susceptible to passivation in the presence of oxygen (i.e., corrosion-susceptible). The acidic treatment solution is applied to the conductive metal substrate. Such application of treatment solution may include submerging the metal substrate in a container filled with acidic treatment solution for the requisite length of time necessary to remove the metal oxides. In alternate preferred embodiments, the application of treatment solution may include spraying the conductive metal substrate with acidic treatment solution. The surface of the metal may also be sprayed and submerged, either simultaneously or in successive processing steps. The application of the acidic treatment solution ensures that the passivation layer of metal oxides is removed from the surface of the substrate. The removal of the passivation layer provides reduced electrical contact resistance of the substrate when compared to the pre-treated state of the substrate.

After the acidic treatment solution has been applied, the metal oxides are transformed by ionic interaction with the preferred anions of the acidic treatment solution to form metal species soluble in the solvent of the acidic treatment solution. One preferred solvent in the acidic treatment solution according to the present invention is water. Thus, the preferred anions preferably create a metal anion species that is hydrophilic and ionic, which is soluble in water. Hence, during the application process, the soluble metal species is likewise dissolved in solvent and removed from the metal surface and dispersed into the acidic treatment solution.

The surface of the metal substrate is preferably rinsed after applying the treatment solution. The rinsing of the metal substrate surface removes substantially all of any residual acidic treatment solution remaining on the metal substrate. By "substantially all" it is meant that a large portion of the acidic treatment solution is removed, so that the metal surface is not detrimentally impacted by the presence of residual acidic treatment solution. Long term exposure to residual acidic treatment solution may cause physical deformities in the metal surface, such as pitting or embrittlement, for example, or may impede the efficacy of subsequent processing. Thus, it is preferred that the metal surface is rinsed to remove most, or substantially all, of the residual acidic treatment solution.

The rinsing is preferably conducted with a similar solvent as that used in the acidic treatment solution, which is preferably deionized water. After exposure to a low pH acid (i.e., the acidic treatment solution) during application, it is preferred that a first rinse solution is mildly acidic rather than neutral (i.e., has a pH of less than 7 and greater than about 4) to prevent shocking of the metal surface, which could cause precipitates to form. In certain preferred embodiments, use of the first rinse solution is sufficient to remove substantially all of any residual acidic treatment solution on the surface. The first rinse solution may be used for multiple rinse sequences, if necessary. The first rinse solution preferably comprises deionized water and a mild and inexpensive acid solute, such as acetic acid, carbonic acid, and the like, or very low concentrations of more aggressive acids, such as sulfuric acid.

In alternate preferred embodiments, an additional sequential rinsing step may be employed with a second rinse solution. The second rinse solution is preferably neutral with a pH of approximately 7, which can be used after exposure to the first mildly acidic rinse, so that there is no danger of shocking the metal surface. A second neutral rinse solution preferably comprises deionized water. Each of the respective first and second rinse solutions may be used multiple times to rinse the surface of the metal substrate, if necessary, to remove substantially all of the acidic treatment solution.

Thus, the treatment of the surface of the metal substrate with an acidic solution, activates the surface by transforming metal oxides to soluble metal anion species. The rinsing of the acidic solution and metal anion species from the surface according to the present invention, further ensures removal of the passivation layer. The present invention provides electrically conductive elements where the contact resistance of the metal is drastically reduced from its pre-treated state to a level such that metal prone to forming electrically insulating passivation layers of metal oxide, such as stainless steel, may be activated to the extent that they may be employed as a metal substrate for an electrically conductive element in a fuel cell.

In certain preferred alternate embodiments of the present invention, the metal substrate is pre-cleaned prior to applying the acidic treatment solution. Such cleaning typically serves to remove any loosely adhered contaminants, such as oils, grease, waxy solids, particles (including metallic particles, carbon particles, dust, and dirt), silica, scale, and mixtures thereof. Many contaminants are added during the manufacturing of the metal material, and may also accumulate on the surface during transport or storage. Thus, pre-cleaning is preferred in circumstances where the metal substrate provided for processing is soiled with contaminants. Pre-cleaning may entail mechanical abrasion; cleaning with traditional alkaline cleaners, surfactants, mild acid washes; or ultrasonic cleaning. The choice of the appropriate cleaning process or sequence of cleaning processes is selected based upon both the nature of the contaminant and the metal.

Mechanical cleaning or polishing may include abrading the surface with a pad or roller comprising abrasive particles. Examples of abrasive pads may include those having silicon carbide or aluminum oxide dispersed on a nylon matrix, or paper with sand or diamond particles, for example. A commercially available abrasive pad having SiC on a nylon matrix is Scotch-Brite® manufactured by 3M corporation of St. Paul, Minn. Other methods of mechanically cleaning may include abrasive blasting of the surface, which can be done with plastic (polymer) blast beads, walnut shells, sand, or glass particles. Other mechanical cleaning or polishing methods known to those of skill in the art may also be used.

Alkaline cleaners are preferred for pre-cleaning, especially to remove organic oils and materials from the surface of the metal. Preferred alkaline cleaners have a pH in the range of about 9 to 14. The alkaline cleaners preferred for the present invention generally comprise a builder composition and a surfactant to facilitate emulsification of organic compounds. Other additives may also be included in an alkaline cleaner, including organic or inorganic additives, chelating agents, and sequestrants which enhance cleaning of the surface. Alkaline cleaners are typically applied by immersion or spray. The cleaning step is usually followed by a rinse with deionized water, prior to treating with the acidic treatment solution.

Alkaline cleaners may operate by three mechanisms, including saponification, emulsificiation, or dispersion. Often all three mechanisms are employed in one particular alkaline cleaner. The builder composition is generally the alkaline salt, and may comprise blends of alkaline salts, usually selected from the group consisting of: alkali metal orthophosphates, alkali metal condensed phosphates, alkali metal hydroxides, alkali metal silicates, alkali metal carbonates, alkali metal bicarbonates, and alkali metal borates. Preferred alkali metals for the builder composition are sodium and potassium. Surfactants are preferably organic compounds that provide detergency, emulsification and wetting in an alkaline cleaner, and are well known in the art. In one preferred alkaline cleaner, the builder constituents are potassium hydroxide and tetrapotassium pyrophosphate, present in a water solvent from about 10-30 wt. % and 1-10 wt. %, respectively. Such an alkaline cleaner is commercially available as PARCO® Clean 1200 from Henkel Surface Technologies of Madison Heights, Mich. Other surface cleaning methods may include ultrasonic cleaning (generally coupled with either an alkaline or acidic cleaner) where electrical energy is converted by transducers to ultrasonic waves; corona discharge or radio-frequency glow-discharge, both of which treat the target surface to an electrical discharge (i.e., corona) which disperses reactive oxygen or other gas molecules to activate the surface. All of the above cleaning methods are suitable for the pre-cleaning process.

As previously discussed, the acidic treatment solution application activates the surface of an electrically conductive element substrate by removing the passivation layer (metal oxides). However, although the underlying metal substrate is restored to its pre-passivated state with an activated surface, the metal substrate still remains susceptible to new corrosion where a new passivation layer comprising metal oxides may re-form at the surface. The passivation layer will form upon exposure to a corrosion agent, such as oxygen, present in the ambient atmosphere and within the fuel cell. Thus, removing the passivation layer promotes electrical conductivity by reducing overall contact resistance. However, if the metal substrate is exposed to oxygen, the passivation layer will re-form at the surface, counteracting the activation process.

Figure 5:
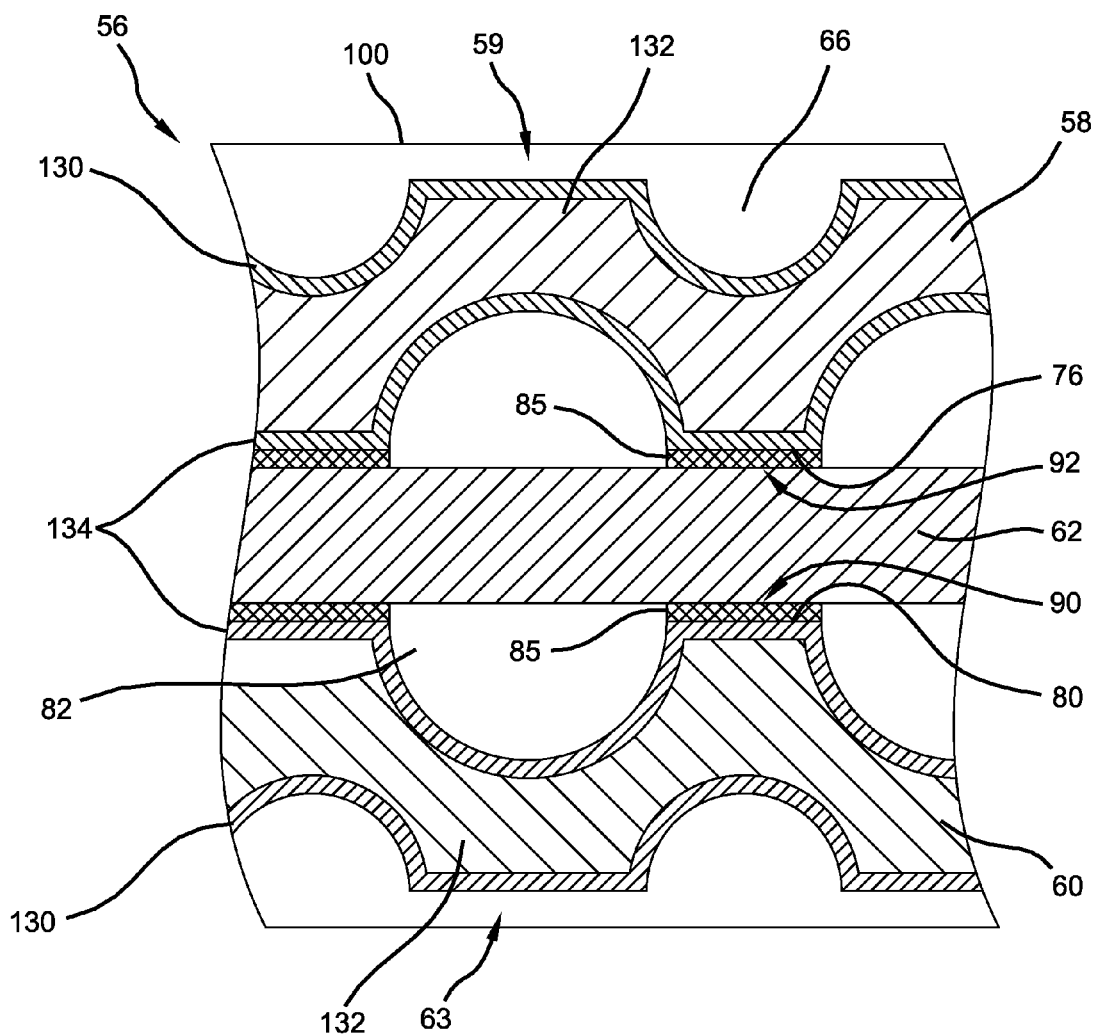
FIG. 5 is a magnified portion of the bipolar plate of FIG. 3.

Hence, after the passivation layer is removed, the electrically conductive element is preferably protected from further corrosion/passivation by physically protecting it from corrosive agents to prevent the re-formation of a passivation layer at the surface of the metal substrate. As shown in FIG. 5, the electrically conductive element (e.g. bipolar plate 56) has a protective coating 130 overlaying the corrosion susceptible metal substrate 132 on both the first surface 59 of the first sheet 58 and the second surface 63 of the second sheet 60. Further, the protective coating 130 is applied to the interior first surface 90 of the first sheet 58 and second surface 92 of the second sheet 60, to protect the substrate 132 from corrosive oxidative attack by the coolant. From a practical point of view, it is not necessary to coat the interior or coolant passages of the bipolar plate in the case of stainless steel or titanium applications. The protective coating 130 is a practical way to isolate the electrically conductive element from corrosive agents that are prevalent both in the processing environment and in the fuel cell itself. Thus, it is preferred that the protective coating 130 is applied to the conductive and corrosion-susceptible regions (e.g. surfaces 59, 60, 90, 92) of the electrically conductive element 56, such that the underlying metal substrate 132 is protected from corrosive agents that would react with the metal to electrically inactivate/passivate each surface. Thus, select regions may include only the electrically conductive areas that form conductive pathways across the electrically conductive element or such regions may coincide to the entire surface of the substrate.

According to preferred embodiments of the present invention, the protective coating 130 is applied within a short duration of time after the metal substrate 132 is removed from the rinsing process, to minimize the re-formation of metal oxides in a passivation layer at the surface. Thus, it is preferred that the protective coating 130 is applied within a period of two hours, and most preferable that the protective coating 130 is applied to the metal substrate 132 surface in 30 minutes or less. A short time between the treatment with the acidic solution and the application of the protective coating 130 minimizes the exposure to oxygen to reduce the amount of metal oxides or thickness of a passivation layer forming at the surface. As appreciated by one of skill in the art, various processing conditions and material characteristics may impact the rate of passivation at the surface, and hence may impact how quickly the protective coating 130 should be applied to the metal surface. Ideal processing times may be discerned based on material characteristics, physical testing, and other empirical results.

The protective coatings 130 of the present invention are preferably corrosion resistant electrically conductive coatings, that protect the underlying metal substrate 132 from exposure to corrosion agents. More specifically, the protective coatings 130 preferably have a resistance less than about 50 ohm-cm$^2$ ($\Omega$-cm$^2$) and comprise a plurality of oxidation-resistant, acid-insoluble, conductive particles (i.e., on the order of about 50 microns or less than about 50 microns) dispersed throughout an acid-resistant, oxidation-resistant polymer matrix, where the polymer binds the particles together and holds them on the surface of the metal substrate 132. The coating contains sufficient conductive filler particles to produce a total resistance no greater than about 50 ohm-cm$^2$ and has a thickness between about 2 microns and about 75 microns, preferably between 2 and 30 microns, depending on the composition, resistivity and integrity of the coating. Thinner coatings (i.e., about 15-25 microns are most preferred for minimizing the IR drop through the stack. Impervious protective coatings 130 are preferred for the present invention to protect the underlying metal substrate 132 surface from permeation of corrosive agents.

Preferably, the conductive filler particles are selected from the group consisting of gold, platinum, graphite, carbon, nickel, conductive metal borides, nitrides and carbides (e.g. titanium nitride, titanium carbide, titanium diboride), titanium alloyed with chromium and/or palladium, niobium, rhodium, rare earth metals, and other noble metals. Most preferably, the particles will comprise carbon or graphite (i.e., hexagonally crystallized carbon). The particles comprise varying weight percentages of the coating depending on the density and conductivity of the particles (i.e., particles having a high conductivity and low density can be used in lower weight percentages). Carbon/graphite containing coatings will typically contain 25 percent by weight carbon/graphite particles. The polymer matrix comprises any water-insoluble polymer that can be formed into a thin adherent film and that can withstand the hostile oxidative and acidic environment of the fuel cell. Hence, such polymers, as epoxies, silicones, polyamide-imides, polyether-imides, polyphenols, fluoroelastomers, polyesters, phenoxy-phenolics, epoxide-phenolics, acrylics, and urethanes, inter alia are seen to be useful with the present invention. Both thermoset and thermoplastic polymers are suitable for producing impermeable coatings.

In accordance with one embodiment of the invention, the conductive polymer coating 130 is applied directly to the substrate metal 132 and allowed to dry/cure thereon. The coating 130 may be applied in a variety of ways, and examples of such methods are described in detail in U.S. Pat. No. 6,372,376 to Fronk et al. and may include (1) electrophoretic deposition, (2) brushing, spraying or spreading, or (3) laminating. The present invention is adaptable for use in continuous manufacturing process such as coil coating. Electrophoretically deposited coatings are particularly advantageous because they can be quickly deposited in an automated process with little waste, and can be deposited substantially uniformly onto substrates 132 having complex and recessed surfaces like those used to form the reactant flow fields on the working surface(s) of the conductive elements. Electrophoretic deposition is a well-known process used to apply polymers to conductive substrates. When cross-linkable polymers are used, the suspension also includes a catalyst for promoting the cross-linking. Cathodically deposited coatings are preferred for fuel cell applications, and are deposited by a process wherein positively charged polymer is deposited onto a negatively charged substrate. Cathodic epoxies, acrylics, urethanes and polyesters are useful with this method of depositing the coating. Other examples of suitable polymers include thermoset and thermoplastic resins, such as those disclosed in the U.S. Pat. No. 6,372,376 to Fronk, et al. and the references cited therein. Subsequent baking of the coated conductive element cures and densifies the coating.

According to another embodiment of the invention, the coating 130 is first formed as a discrete film (e.g. by solvent casting, extrusion etc.), and then laminated onto the working surface of the conductive element, e.g., by hot rolling. This technique will preferably be used to make laminated sheet stock from which the conductive elements are subsequently formed, e.g. as by stamping. In this embodiment, the discrete film will preferably contain a plasticizer to improve handling of the film and to provide a coating layer atop the substrate 132 that is supple enough so that it can be readily shaped, (e.g. stamped) without tearing or disrupting the film when the conductive element is formed as by stamping. To ensure adherence of the coating 130 to the substrate 132, the surface of the substrate 132 to which the film is applied should be pre-cleaned as described above including removing all undesirable surface films (e.g., oil). It is also preferred that the surface is treated with a conversion coating, roughened, or abraded to roughen the surface for anchoring the polymer film thereto. Fluoropolymers such as polyvinylidene difluoride and a fluoroelastomer, an FPM fluoroelastomer, such as Viton vinylidene fluoride hexafluoropropylene copolymer from DuPont Dow are exemplary, or the like are useful with this embodiment, and may be used with conventional plasticizers such as dibutyl phthalate.

According to another embodiment of the invention, the electrically conductive polymer film 130 is applied to the surface of the metal substrate 132 by spraying, brushing or spreading (e.g. with a doctor blade). In this embodiment, a precursor of the coating 130 is formed by dissolving the polymer in a suitable solvent, mixing the conductive filler particles with the dissolved polymer and applying it as a wet slurry atop the substrate 132. The wet coating is then dried (i.e., the solvent removed) and cured as needed (e.g., for thermosets). The conductive particles adhere to the surface by means of the solvent-free polymer.

A preferred polymer useful with this embodiment comprises a polyamide-imide thermosetting polymer. The polyamide-imide is dissolved in a solvent comprising a mixture of N-methylpyrrolidone, propylene glycol and methyl ether acetate. To this solution is added about 21% to about 23% by weight of a mixture of graphite and carbon black particles wherein the graphite particles range in size from about 5 microns to about 20 microns and the carbon black particles range in size from about 0.5 micron to about 1.5 microns with the smaller carbon black particles serving to fill the voids between the larger graphite particles and thereby increase the conductivity of the coating compared to all-graphite coatings.

The mix is applied to the substrate 132, dried and cured to provide 15-30 micron thick coatings (preferably about 17 microns) having a carbon-graphite content of about 38% by weight. It may be cured slowly at low temperatures (i.e., <200° C.), or more quickly in a two step process wherein the solvent is first removed by heating for ten minutes at about 150° C. to 175° C. (i.e., dried) followed by higher temperature heating (250° C. to 400° C.) for various times ranging from about 30 seconds to about 900 seconds (15 min), the time being dependent on the temperature used to cure the polymer.

EXAMPLE 1

An electrically conductive element according to a preferred embodiment of the present invention is prepared by providing stainless steel strips samples measuring approximately 31 cm×18 cm×0.02 cm. The stainless steel is Type 316L, cold rolled, bright annealed, strip, UNS S31603 in accordance with ASTM A480 from Arcelor, S. A. located in Grand-Duché, Luxembourg. The steel substrate is pre-cleaned by spraying an alkaline cleaning solution of PARCO® Clean 1200 (an alkaline cleaner with a builder constituent comprising potassium hydroxide and tetrapotassium pyrophosphate) at 5 wt % and 95 wt % deionized water for 10 seconds at 71° C. A deionized water rinse is sprayed onto the surface to remove any residual alkaline cleaning solution.

An acidic treatment solution is prepared by admixing 3 wt % sulfuric acid solution; 97 wt % deionized water solvent; and 284 ppm of HF. The sulfuric acid can be purchased as Ridolene® 123, available from Henkel Surface Technologies of Madison Heights, Mich., which has a sulfuric acid concentration range of between 30 to 60 wt %, as well as a surfactant. Ridolene® 123 also contains up to about 10% surfactant. The hydrofluoric acid can be purchased from VWR Scientific Products Inc. The acidic treatment solution is sprayed on the steel substrate surface for 10 seconds at 66° C. to activate the surface and remove metal oxides. The steel substrate is then sprayed for about 10 seconds at about 66° C. with a first rinse solution comprising 1 wt % $H_2SO_4$ and 99 wt % deionized water. The steel substrate is further sprayed for about 10 seconds at about 66° C. with a second rinse solution comprising 100 wt % deionized water. The surface of the steel substrate is then dried by a pair of squeegee rollers at 26° C., such as 30-90 Shore A Durometer elastomer such as ethylene propylene rubber or polychloroprene.

An electrically-conductive protective polymer coating matrix supplied by Acheson Colloids Company, Port Huron, Mich. as Electrodag® EB-008 is applied to the stainless steel substrate by spray coating at room temperature (26° C.). The stainless steel substrate having a spray coating of polymer matrix is placed in an oven at 150° C. for 10 minutes to vaporize the solvents and is then placed in an oven at 260° C. for 30 minutes to cure the polymeric matrix.

EXAMPLE 2

An electrically conductive element prepared according to an alternate preferred embodiment of the present invention is prepared by providing the same stainless steel strips samples as those in Example 1. The steel substrate is pre-cleaned with the same alkaline cleaning solution and rinse solution as in Example 1.

An acidic treatment solution is prepared by admixing 3 wt % sulfuric acid solution; 97 wt % deionized water solvent; and 568 ppm of HF. The sulfuric acid is provided as Ridolene® 123, as used in Example 1. The hydrofluoric acid can be purchased from VWR Scientific Products Inc. The acidic treatment solution is sprayed on the steel substrate surface for 10 seconds at 66° C. to activate the surface and remove metal oxides. The steel substrate is then rinsed, dried, and coated in the same manner as the conductive element described in Example 1.

EXAMPLE 3

An electrically conductive element prepared according to another alternate preferred embodiment of the present invention is prepared by providing the same stainless steel strips samples as those described in Example 1. The steel substrate is pre-cleaned at the same conditions with the same alkaline cleaning solution and rinse solution as in Example 1.

An acidic treatment solution is prepared by admixing 3 wt % sulfuric acid solution and 97 wt % deionized water solvent. The sulfuric acid is provided as Ridolene® 123, as used in Example 1. The acidic treatment solution is sprayed on the steel substrate surface for 10 seconds at 66° C. to activate the surface and remove metal oxides. The steel substrate is then rinsed, dried, and coated in the same manner as the conductive element described in Example 1.

Figure 6:
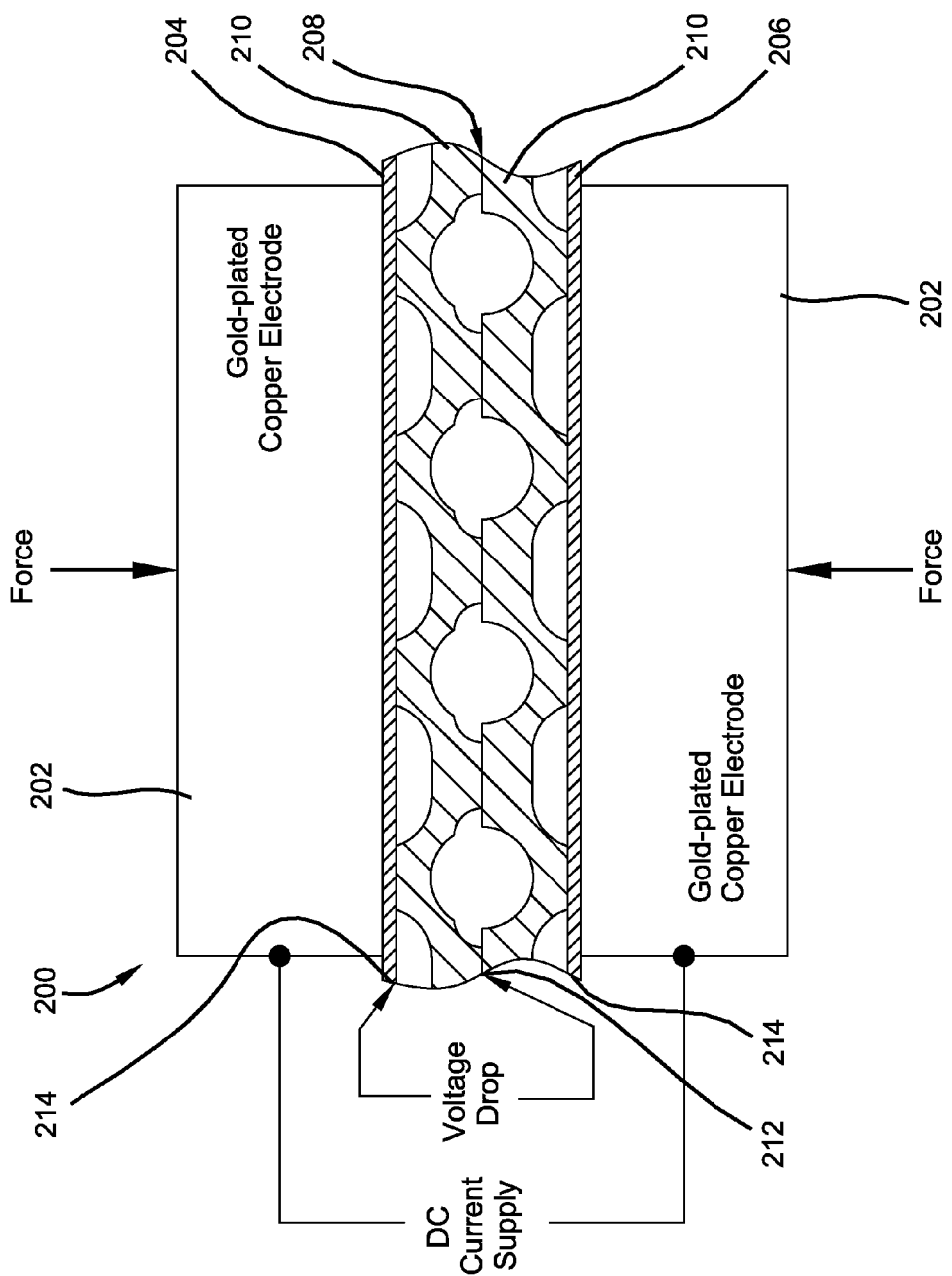
FIG. 6 is an exemplary testing apparatus used to measure the contact resistance of a sample.

Immediately after the application of acidic treatment solution and before the protective coating in Examples 1, 2, and 3, the contact resistance measurements of the activated stainless steel samples were measured via a testing apparatus as shown in FIG. 6. The testing apparatus comprises a carver press 200 with gold coated platens 202 and a first and second electrically conductive activated carbon paper media 204,206 respectively, pressed between a sample 208 and the gold coated platens 202. A surface area of 49 $cm^2$ was tested using 50 A/$cm^2$ current which is applied by a direct current supply. The resistance is measured using a four-point method and calculated from measured voltage drops and from known applied currents and sample 208 dimensions. The voltage drop is measured across either two diffusion media 204,206 through the sample 208 (total contact resistance) or across two points on the sample 208 surface 209 (bulk contact resistance). The sample 208 may comprise a single stainless steel plate or a bipolar plate having two plates 210 joined (e.g. brazed) together, which is shown in FIG. 6. In the circumstance where the bipolar plate is tested, the bulk contact resistance is measured from a midpoint 212 between the two plates 210 to an exterior 214 of either plate 210, to establish a value for a single plate 210. Contact resistance measurements were measured as milli-Ohm square centimeter (m$\Omega$-cm$^2$) with incremental force applied at the following pressures: 200 p.s.i. (1400 kPa), 300 p.s.i. (2000 kPa), 400 p.s.i. (2700 kPa).

It should be noted that the contact resistance of the conductive carbon paper 204,206 is generally a known value, which can be subtracted from the measurement to establish the contact resistance of the metal plate 210 only. During testing of the samples, a 1 mm thick Toray carbon paper (commercially available from Toray as TGP-H-0.1T) was used for the first and second carbon paper media 204,206. However, in many circumstances the contact resistance of the conductive paper 204,206 is negligible and adds such a small incremental value to the contact resistance value, that it need not be subtracted. The values referred to herein are for the interfacial electrical contact resistance of the sample 208 only, and reflect contact resistance values for the metal plate 210 alone.

Figure 7:
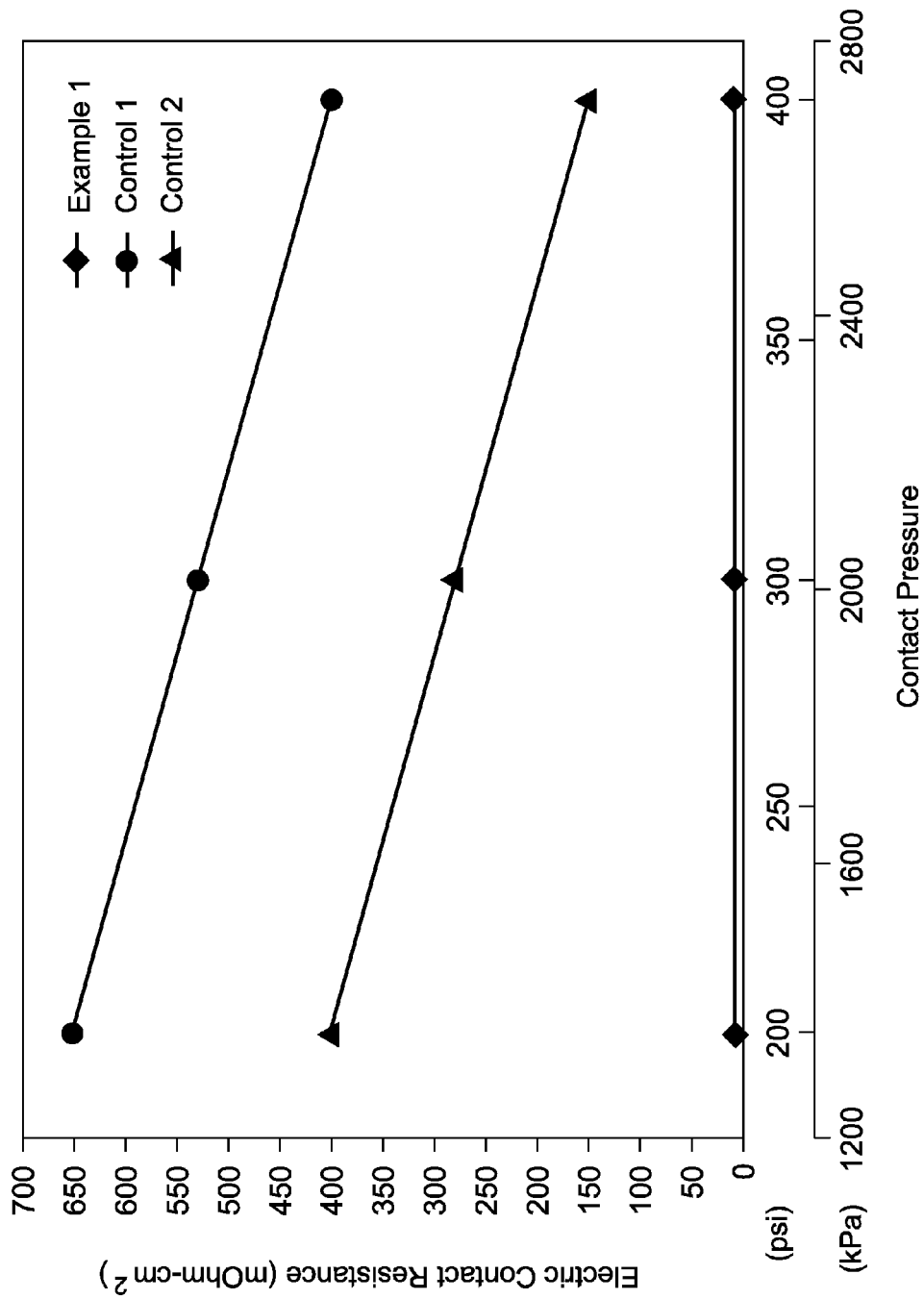
FIG. 7 is a graph comparing the electrical contact resistance of 316 L stainless steel samples at various applied pressure values prepared according to the present invention and by prior art methods of preparation.

Results of such testing are shown in FIG. 7 and Table 1. FIG. 7 shows the contact resistance for the sample in Example 1, as well as Control 1, which is an untreated sample of the stainless steel strip as described above in the Examples, as received from the manufacturer. FIG. 7 also shows Control 2, which is a similar sample of 316L stainless steel, however it was treated with only the known method of cleaning with an alkaline cleaner, PARCO® 1200 for 10 seconds at 66° C. The contact resistance measurements were taken for both the upper first paper 204 through the sample 208 and the second lower paper 206 through the sample 208, with both values averaged to provide the resulting contact resistance values indicated below in Table 1 as average bulk contact resistance values in m$\Omega$-cm$^2$ for Examples 1-3 and Controls 1-2.

TABLE 1

| Applied Pressure | Control 1 | Control 2 | Example 1 | Example 2 | Example 3 |
|---|---|---|---|---|---|
| 200 p.s.i (1400 kPa) | 637.0 | 399.4 | 4.5 | 5.2 | 5.9 |
| 300 p.s.i. (2000 kPa) | 499.8 | 277.3 | 3.7 | 4.4 | 4.9 |
| 400 p.s.i. (2700 kPa) | 377.8 | 158.3 | 3.4 | 4.2 | 4.6 |

As can be observed from FIG. 7 and Table 1, the samples that were treated according to the present invention have a significantly reduced (2 orders of magnitude less) contact resistance. Although the prior art cleaning with an alkaline cleaner shows a reduction in contact resistance, the contact resistance still remains impermissibly high for use as an electrically conductive element. Further, it should be noted that the treatment times with acidic treatment solution are 10 seconds in Examples 1, 2, and 3, and achieve contact resistance values within a desirable range.

Although, the description of the present invention in the Examples above is merely exemplary, it is preferred for conductive elements according to the present invention that the contact resistance for the electrically conductive substrate is less than about 10 m$\Omega$-cm$^2$ under a compressive force. Based on the trends exhibited here for contact resistance as a function of compressive force, even a contact resistance corresponds to a contact resistance measurement with low compressive force corresponding to firm, forced engagement (i.e., up to 200 psi) according to the present invention is better than that of the controls under significant compressive force (i.e., 300 to 400 psi). Thus, in preferred embodiments of the present invention, where the compressive force is applied at 400 psi applied pressure (i.e., 2700 kPa) as measured across the conductive element sample and one piece of conductive paper, is less than 10 m$\Omega$-cm$^2$, and most preferably less than 5 m$\Omega$-cm$^2$. When the protective coating is applied over the treated surface, it is preferred that the overall contact resistance, through the conductive protective coating, and treated surface of the metal substrate is less than 30 m$\Omega$-cm$^2$ under a compressive force applied at a pressure of about 400 psi. (2700 kPa) and most preferably below total contact resistance of less than about 5 m$\Omega$-cm$^2$. Thus, the present invention provides a method and composition for treating an electrically conductive element for a fuel cell, that reduces the metal substrate contact resistance to levels that permit the use of previously unavailable metals in a shorter duration than was previously feasible.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electrically conductive element comprising:
   an electrically conductive corrosion susceptible metal substrate comprising stainless steel having a contact resistance of less than or equal to about 10 m$\Omega$-cm$^2$ under a compressive force of about 2700 kPa, and an electrically conductive corrosion resistant coating comprising a polymeric matrix including an organic polymer and a mixture of graphite and carbon particles, said coating directly overlying one or more regions of a surface of said metal substrate, wherein said surface comprises an activated area free of metal oxides, and said surface directly overlaid with said electrically conductive corrosion resistant coating has a total contact resistance of less than about 30 m$\Omega$-cm$^2$ at a pressure of about 2700 kPa wherein said electrically conductive corrosion resistant coating has a thickness of less than about 30 µm, and wherein said electrically conductive metal substrate forms a bipolar plate configured as part of an electrochemical cell.

2. The electrically conductive element according to claim 1, wherein said contact resistance is less than or equal to about 5 m$\Omega$-cm$^2$ under a compressive force of about 2700 kPa.

3. The electrically conductive element according to claim 1, wherein said electrically conductive corrosion resistant coating comprises an organic polymer.

4. The electrically conductive element according to claim 1, wherein said electrically conductive corrosion resistant coating overlies said entire surface.

5. The electrically conductive element according to claim 1, wherein said electrically conductive corrosion resistant coating overlies select regions of said surface.

6. The electrically conductive element according to claim 1, wherein said surface is treated by introducing an acidic agent comprising a halogen to remove oxides from said surface.

7. An electrically conductive element comprising:

an electrically conductive corrosion susceptible metal substrate comprising stainless steel having a contact resistance of less than or equal to about 5 mΩ-cm$^2$ under a compressive force of about 1400 kPa, and an electrically conductive corrosion resistant coating comprising a polymeric matrix including an organic polymer and a mixture of graphite and carbon particles, said coating directly overlying one or more regions of a surface of said metal substrate, wherein said surface comprises an activated area free of metal oxides, and said surface directly overlaid with said electrically conductive corrosion resistant coating has a total contact resistance of less than about 10 mΩ-cm$^2$ at a pressure of about 1400 kPa or greater wherein said electrically conductive corrosion resistant coating has a thickness of less than about 30 μm, and wherein said electrically conductive metal substrate forms a bipolar plate configured as part of an electrochemical cell.

8. An electrically conductive element for an electrochemical cell, the element consisting essentially of:

a stainless steel metal substrate having an activated surface free of metal oxides, said activated surface having a contact resistance of less than about 10 mΩ-cm$^2$ under a compressive force of about 2700 kPa; and a single electrically conductive polymer matrix coating layer applied directly to one or more regions of said activated surface of said metal substrate wherein said electrically conductive polymer matrix coating layer comprises an organic polymer and a mixture of graphite and carbon particles and has a thickness of less than about 30 μm, and wherein said metal substrate forms a bipolar plate configured as part of the electrochemical cell.

9. The electrically conductive element according to claim 8, wherein said electrically conductive polymer matrix coating overlies said entire activated surface.

10. The electrically conductive element according to claim 8, wherein said electrically conductive corrosion resistant coating overlies select regions of said activated surface.

* * * * *